United States Patent [19]

Dausch

[11] 4,444,030
[45] Apr. 24, 1984

[54] DEVICE FOR THEFT-PROVING VEHICLES

[76] Inventor: Ladislao F. Dausch, Postiach 76, 6208 Bad Schwalbach, Fed. Rep. of Germany

[21] Appl. No.: 389,094

[22] Filed: Jun. 16, 1982

[30] Foreign Application Priority Data

Jun. 20, 1981 [DE] Fed. Rep. of Germany ... 8118060[U]

[51] Int. Cl.³ ............................................. B60R 25/00
[52] U.S. Cl. ........................................ 70/209; 70/226
[58] Field of Search ................ 70/209, 211, 212, 210, 70/225, 226, 237

[56] References Cited

U.S. PATENT DOCUMENTS

| 1,429,334 | 9/1922 | Furber | 70/209 |
| 2,462,982 | 8/1969 | Moore | 70/209 |
| 4,103,524 | 8/1978 | Mitchell | 70/226 |

FOREIGN PATENT DOCUMENTS 631708  6/1936  Fed. Rep. of Germany ........ 70/209

Primary Examiner—Robert L. Wolfe
Attorney, Agent, or Firm—Barnes, Kisselle, Raisch, Choate, Whittemore & Hulbert

[57] ABSTRACT

A device for theft-proving vehicles such as passenger cars, trucks and omnibusses which comprises two body halves (1, 2) being pivotionally connected at their one ends (9, 10) and having recesses (13 through 18) at their other ends (3, 4). A lock (25) is fixed in the one body half (1) and a lock counterpart (26) in the other body half (2). The device can be closed over a steering wheel, the recesses (13 through 18) encompassing the cross beam and the ring thereof. In this situation, the device allows only limited turning of the steering wheel, since it hits against seat or window of the car.

6 Claims, 4 Drawing Figures

DEVICE FOR THEFT-PROVING VEHICLES

This invention relates to theft-proving of vehicles such as cars, trucks and particularly to a device for blocking the steering wheel of a vehicle.

BACKGROUND AND SUMMARY OF THE INVENTION

The usual theft-proving of cars is effected by locking the steering column. For different reasons, the bold of this steering column locking device is not so dimensioned that it cannot be broken using the steering wheel. Therefore, drivers often use further theft-proving devices.

The present invention is directed to create a device for theft-proving of vehicles, which is well visible and cannot be overruled so easily by a thief.

In accordance with the invention, the device for thief-proving of vehicles comprises a two-part-club-shaped body having a thickened end and a shank with a slimming end, the body halves being pivotably connected to one another at the slim end, whereas the other, thickened end being shaped mouth-like having recesses, which register to one another, a lock being housed within the one body half at the transition between thickened end and shank, the lock registering to counter-parts at the other body half.

The device which is to be fastened to the steering wheel for theft-proving can be seen very well and should discourage possible thieves. If all the same a thief gets access to the interior of the vehicle and should overcome the steering column lock, he will not come into the position to steer the vehicle, since the shank of the device hits at the driver's seat and the window. Also if these hindrances were overpowered, the steering wheel cannot be fully turned, since the shank in every case hits at the beam of the door. If the thief cuts through the steering wheel, in order to remove the device, the steering wheel is destroyed. Since the device can be made up of steel, it is hard work to cut it through; by fillings within the shank provision can be taken that the shank cannot be cut through so easily.

For different types of vehicles such as trucks and onmibusses different sizes also with respect to the mouth width are possible.

DESCRIPTION

Figures 1, 2:
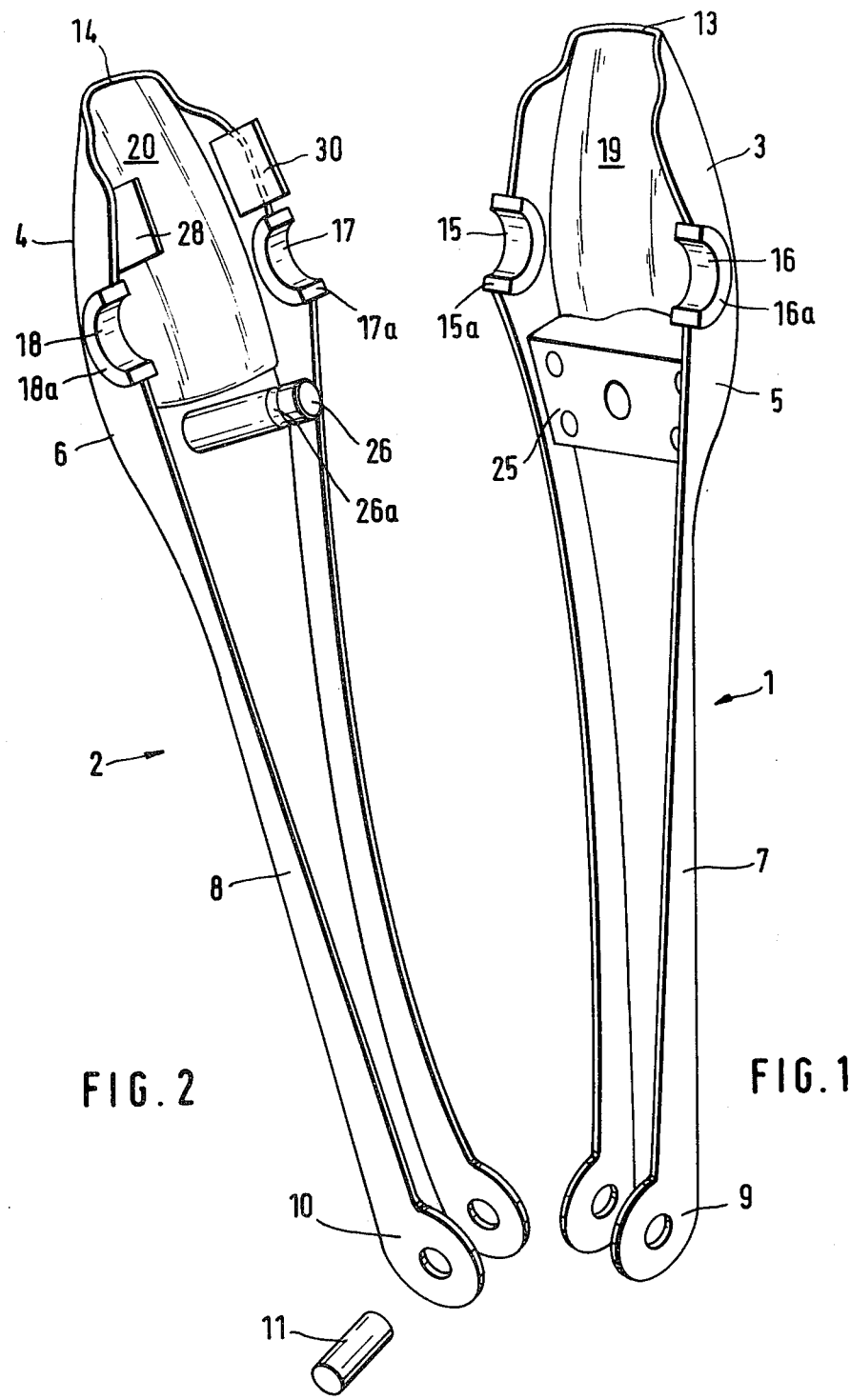
FIG. 1 is a view of one body half.
FIG. 2 is a view of the other body half.
Figure 3:
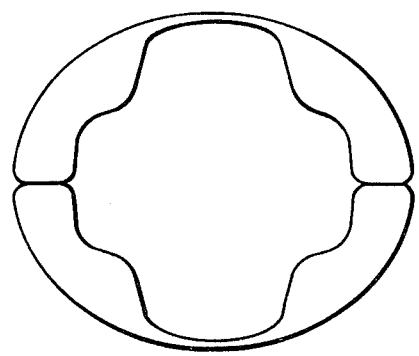
FIG. 3 is a view looking onto the mouth of the device and
FIG. 4 shows the device fastened at a steering wheel.
Figure 4:
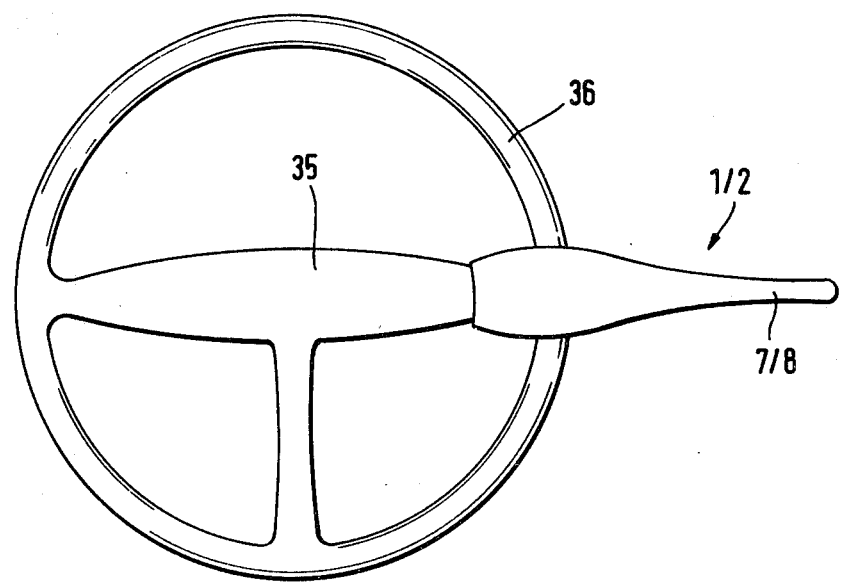

An embodiment of the invention is described with reference to the drawings. The theft-proving device for cars comprises two body halves 1 (FIG. 1) and 2 (FIG. 2), each having a thickened end 3 and 4, a transitional section 5 and 6 and a shank 7 and 8 having a slim end 9 and 10, respectively. The two body halves 1 and 2 are pivotionally fastened to one another by a hinge pin 11 and can be swung away or opened and folded together or closed. The device, in its closed position, has a club-shaped appearance. Both body halves 1 and 2 consist of steel sheet which is 1,8 mm strong and is formed by pressing.

The thickened ends 3 or 4 are shaped mouth-like in order to encompass the steering wheel of a vehicle and—to that purpose—at the forward end have each an axially directed recess 13 or 14 and—near the thickest region of the club—two crossing recesses 15, 16 or 17, 18. The rims of the recesses can be made broader by bushings 15a, 16a, 17a, 18a of hard rubber in order to avoid damages at the steering wheel to be secured. For the same purpose, the interior of both body halves 1 and 2 can be covered by foam rubber pieces 19, 20 in the region of the mouth.

A lock 25 is fixed within the transitional section 5 and a bold-like counterpart 26 is fixed within the transitional section 6. The lock counterpart 26 is a welded pin or rivet and has a groove 26a wherein the mechanism of the lock 25 engages, when the device is closed. Within the transitional section 4 there is a keyhole through which the lock 26 can be opened by a safety key.

As an alternative to the embodiment shown, the lock 25 can be shaped cylindrically having a locking bold which is radially actuated, whereas the lock counterpart 26 is sleeve-shaped having a locking groove in its hollow.

In order to cover the slot between both body halves 1 and 2 in the closed position of the device, teeth 28 and 30 are welded within the mouth which extend in the region between the recesses 13 through 18 parallely to the local body wall. When the device is closed, therefore, it is not possible to enter with a tool into the slot between the two body halves and to try to separate both body halves by force.

The thickened ends 3 or 4 together with the transitional sections 5 or 6 are 15 or 20 cm long; the length of the shank 7 or 8 is 20 cm. The total length therefore is 35 to 40 cm. The club at the front end is 6 cm thick or somewhat more, whereas 3 cm is sufficient for the thickness of the shank.

The theft-proving device functions as follows: The steering wheel of a car normally has a crossing beam 35 and a grip ring 36. The two body halves 1 and 2 are folded over the connecting region between crossing beam 35 and grip ring 36, such that the recesses 13, 14 encompass the crossing beam 35 and the recesses 15, 16 and 17, 18 the grip ring 36. The shank 7, 8 of the device extends in the free space within the car. This free space is not so extended such that the steering wheel could be turned by sufficient amounts, to the contrary, the shank end hits at the seat and the window; also the door beam is a hindrance against turning of the steering wheel which cannot be overruled.

In the hollow of the body between lock 25 and lock counterpart 26 on the one hand and the slim ends 9 and 10 on the other hand there can be inserted a filling which makes it difficult to cut the shank 7, 8. Such a filling can also include a smoke developing substance or similar.

The embodiment shown has some resemblance to the head of a cobra, however, it is also possible to make the transitional sections 5, 6 longer, such that the device assumes a fish-like appearance. The dimensions referred to above are shaped for theft-proving devices for passenger cars, it goes without saying that for trucks and omnibusses bigger dimensions, particularly for the mouth, come into question.

What is claimed is:
1. A device for theft-proving of vehicles comprising a club-shaped body,
said body having two halves, each half comprising:

a thickened end and a shank having a slim end,
means for pivotionally connecting said body halves at their slim ends,
said body halves having recesses at their thickened end, said recesses registering in pairs,
a lock and a lock counterpart,
said lock being housed in said first body half in a transitional section between thickened end and shank,
the lock counterpart being housed in said second body half in a transitional section between thickened end and shank.

2. A device set forth in claim 1 wherein each said thickened end together with said transitional section and the shank are about 20 cm long.

3. The device set forth in claim 1 wherein said thickened end has a thickness of about 6 cm.

4. A device set forth in claim 1 wherein said recesses are in three pairs, one pair being axially directed and located at the foremost end of the device, whereas the further two pairs are arranged in said thickened end where it is thickest, and in a crossing direction.

5. The device set forth in claim 4 wherein in the region between said recesses, near wall portions of said body, teeth are fixed within said body which cover the slot between said two body halves, when the device is closed.

6. The device according to claim 1 wherein said body halves are made up of sheet steel.

* * * * *